(12) United States Patent
Kim et al.

(10) Patent No.: US 8,030,832 B2
(45) Date of Patent: Oct. 4, 2011

(54) METHOD FOR PREPARING ELECTRODE SYSTEM, ELECTRODE SYSTEM PREPARED THEREFROM, AND ELECTRIC DEVICE COMPRISING THE SAME

(75) Inventors: Sang-Ho Kim, Daejeon (KR); Won-Jong Kwon, Daejeon (KR); Hyeon Choi, Daejeon (KR); Sun-Ah Park, Seoul (KR); Sang-Bok Lee, Seoul (KR)

(73) Assignee: LG Chem, Ltd. (KR)

( * ) Notice: Subject to any disclaimer, the term of this patent is extended or adjusted under 35 U.S.C. 154(b) by 1133 days.

(21) Appl. No.: 10/965,569

(22) Filed: Oct. 14, 2004

(65) Prior Publication Data

US 2005/0117194 A1   Jun. 2, 2005

(30) Foreign Application Priority Data

Oct. 14, 2003  (KR) .................. 10-2003-0071465

(51) Int. Cl.
*H01J 1/88* (2006.01)
*H01L 31/00* (2006.01)
*H01M 4/00* (2006.01)

(52) U.S. Cl. .................. 313/247; 136/256; 429/44

(58) Field of Classification Search ............ 313/243, 313/246, 247, 491, 492; 136/256, 263; 429/36, 429/44

See application file for complete search history.

(56) References Cited

U.S. PATENT DOCUMENTS

| | | | |
|---|---|---|---|
| 5,867,363 A * | 2/1999 | Tsai et al. | 361/502 |
| 5,965,295 A * | 10/1999 | Bando et al. | 429/223 |
| 6,558,848 B1 * | 5/2003 | Kobayashi et al. | 429/241 |
| 6,939,383 B2 | 9/2005 | Eastin et al. | |
| 7,204,895 B2 * | 4/2007 | Kim et al. | 156/1 |
| 7,254,895 B1 | 8/2007 | O'Donnell | |
| 2002/0171081 A1 * | 11/2002 | Vincent et al. | 257/40 |
| 2002/0171907 A1 * | 11/2002 | Vincent et al. | 359/271 |
| 2002/0182479 A1 * | 12/2002 | Mallari et al. | 429/44 |
| 2003/0108785 A1 | 6/2003 | Wu et al. | 429/44 |

(Continued)

FOREIGN PATENT DOCUMENTS

JP    10012124    1/1998

(Continued)

OTHER PUBLICATIONS

PCT International Search Report of Corresponding; International Application No. PCT/KR2004/002612; Filing Date: Oct. 13, 2004; Date of Mailing: Jan. 5, 2005.

(Continued)

*Primary Examiner* — Bumsuk Won
(74) *Attorney, Agent, or Firm* — Cantor Colburn LLP

(57) ABSTRACT

Provided are a method for preparing an electrode system, an electrode system prepared therefrom, and an electric device including the same. The method includes the steps of forming a porous template having nanopores on a first electrode, wherein a diameter of the nanopores is between 5 to nm 500 nm; and forming a rod-type/tube-type second electrode inside the nanopores which are connected to the first electrode, the electrode system prepared therefrom, and an electric device including the same. With the large surface area, the electrode system of the present research improves efficiency and performance of various electric devices. The contrast and respond speed of the electrochromic device can be increased, and the number of electron-hole pairs of a solar cell is increased. The loss of electron-hole pairs is minimized, and charge storage of the supercapacitor and charge respond speed is heightened.

4 Claims, 10 Drawing Sheets

U.S. PATENT DOCUMENTS

| | | | |
|---|---|---|---|
| 2003/0194598 A1* | 10/2003 | Chan | 429/40 |
| 2004/0112421 A1* | 6/2004 | Spivack et al. | 136/256 |
| 2004/0112422 A1* | 6/2004 | Spivack et al. | 136/256 |
| 2004/0115858 A1* | 6/2004 | Spivack et al. | 438/82 |
| 2004/0121238 A1* | 6/2004 | Kelley et al. | 429/245 |
| 2004/0137286 A1* | 7/2004 | Hilmas et al. | 429/12 |
| 2004/0166395 A1 | 8/2004 | Jankowski et al. | 429/40 |
| 2005/0040048 A1* | 2/2005 | Kim et al. | 205/414 |

FOREIGN PATENT DOCUMENTS

| | | |
|---|---|---|
| JP | 2000188058 | 7/2000 |
| JP | 2001-358347 | 12/2001 |
| JP | 2005-072367 | 3/2005 |
| WO | WO 00/02949 | 1/2000 |
| WO | 0162665 A1 | 8/2001 |
| WO | 03/089982 | 10/2003 |

OTHER PUBLICATIONS

Michael Gratzel, "Photoelectrochemical cells," Nature, vol. 414, Nov. 15, 2001, pp. 338-344.

David Cummins, "Ultrafast Electrochromic Windows Based on Redox-Chromophere Modified Nanostructured Semiconducting and Conducting Films," J. Phys. Chem. B, vol. 104, No. 48, 2000, pp. 11449-11459.

India Office Action—1205/DELNP/2005 dated Jul. 29, 2010.

* cited by examiner

METHOD FOR PREPARING ELECTRODE SYSTEM, ELECTRODE SYSTEM PREPARED THEREFROM, AND ELECTRIC DEVICE COMPRISING THE SAME

CROSS REFERENCE TO RELATED APPLICATION

This application claims the benefit of and priority to Korean Patent Application No. 10-2003-0071465 filed in the Korean Intellectual Property Office on Oct. 14, 2003, the entire disclosure of which is incorporated herein by reference.

BACKGROUND OF THE INVENTION (a) Field of the Invention

The present invention is related to a method for preparing an electrode system, an electrode system prepared therefrom, and an electric device comprising the same; and more particularly, to a method for preparing an electrode system by using a porous template, that can enlarge a surface area of an electrode system used in an electric device to improve efficiency and performance of the electric device by improving a response speed of the electric device, accelerate transfer of electron-hole pairs and enlarge a storage space of an electric charge.

(b) Description of the Related Art

An electrode system having a large surface area is favorable for preparing an electric device using reactions that occur on the surface of the electrode system more effectively, compared with a conventional flat electrode system. For example, an electrochromic device having an electrode system with a large surface area is sufficiently colored compared with another electrochromic device having an electrode system with a small surface area, although both electrochromic devices are prepared with the same amount of electrochromic material. It is also known that the response time of the electrochromic device can be increase remarkably because of the large surface area of the electrode system included in the electrochromic device (D. Cummins et. Al., J. Phys. Chem. B, 104, 11449(2000)). In case of a solar cell, the efficiency of the solar cell depends on the effective separation of electron-hole pairs generated on an interface of an electrode and the transfer of the separated electron-hole pair to an anode and a cathode of the electrode. Herein, the large surface area of the electrode can help to increase the number of the electron-hole pairs generated on the interface and also helps to transfer the separated electron-hole pair without much loss. Conventionally, a method for fabricating an electrode by using a nano-sized particle of a metal oxide at a high temperature is introduced and developed to enlarge the surface area of the electrode system (M. Gratzel, Nature, 414, 338 (2001)). However, the above-mentioned conventional method for fabricating the electrode system has problems in that the electrode materials are limited and that the processing temperature is high.

SUMMARY OF THE INVENTION

In order to solve the problems stated above, it is an object of the present invention to provide a method for preparing an electrode system having a large surface area.

It is another object of the present invention to provide an electrode system having a large surface area and an electric device using the same to improve the response speed of the electric device, accelerate transfer of electron-hole pairs and enlarge the capacity of electric charges stored.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

The present invention provides a method for preparing an electrode system having a large surface area by forming a porous template on a first electrode and forming a rod-type or a tube-type of second electrode inside nanopores of the porous template in order to electrically connect the first electrode and the second electrode.

Figure 1:
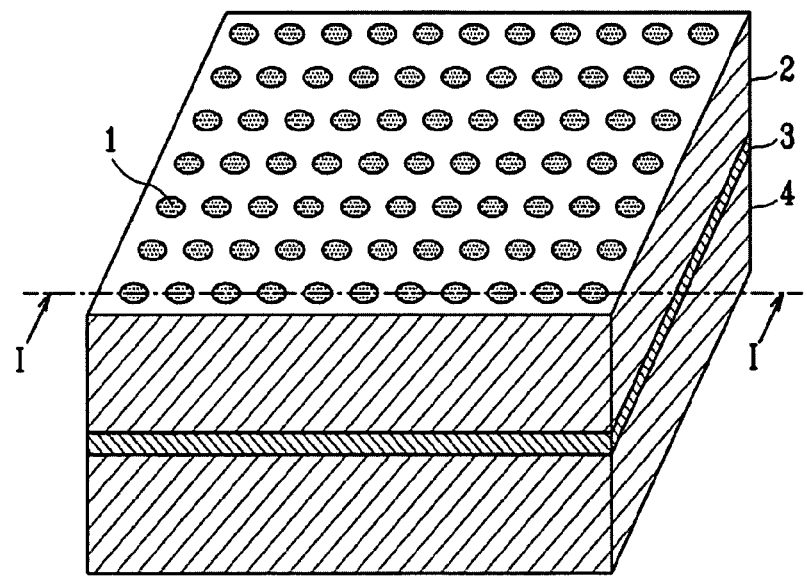
FIG. 1 is a perspective view illustrating an electrode system having a porous template in accordance with a preferred embodiment of the present invention.
Figure 2:
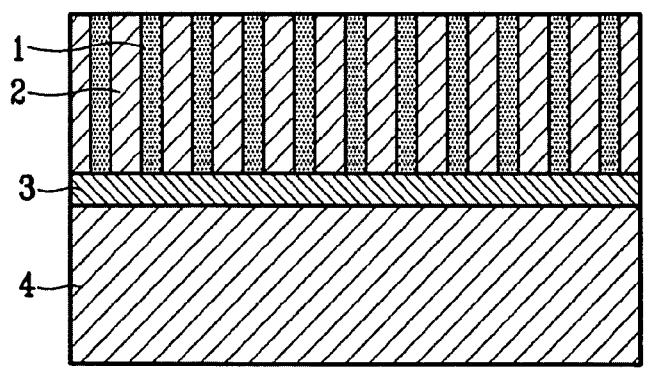
FIG. 2 is a cross sectional view taken along a line I-I of the electrode system of FIG. 1.

FIG. 1 is a perspective view illustrating an electrode system having a porous template in accordance with a preferred embodiment of the present invention, and FIG. 2 is a cross-sectional view taken along with a line I-I of the electrode system in FIG. 1.

Hereinafter, the electrode system is defined as an electrode comprising a first electrode and a second electrode, and further comprises a porous template.

A method for preparing the electrode system for an electric device in accordance with a present invention comprises the steps of: a) forming a porous template on a first electrode which is a flat electrode; and b) forming a rod-type or a tube-type of second electrode inside the porous template.

The first electrode is fabricated by a) using at least one selected from the group consisting of Au, Pt, Ag, Cu, Al, Cr, and alloys thereof, b) by using at least one metal oxide selected from the group consisting of $TiO_2$, Indium Tin Oxide (ITO), ZnO, $WO_3$, $RuO_2$, $IrO_2$, $SnO_2$, and NiO, or c) at least one conductive polymer selected from the group consisting of poly-p-phenylene, polyphenylenevinylene, poly-3,4-ethylenedoxythiophene (PEDOT), polypyrrole, polyaniline, polyazulene, polythiophene, polypyridine, polyindole, polycabazole, polyazine, and polyquinone.

Preferably, an aluminum oxide is used as the porous template in consideration of thickness and nanopore density. There are two methods through which the porous template can be formed, which are described as follows.

Method 1

A first electrode material is formed on one side of a porous aluminum oxide without using a substrate Method 2

A porous aluminum oxide is formed by depositing an aluminum layer on a first electrode formed on a substrate; or using an aluminum substrate as the first electrode and oxidizing the alunminum substrate to form a porous aluminum oxide layer.

The Method 2 is further divided into two methods according to a material used for the first electrode.

Method 2-1

In the case of using aluminum for the substrate and the first electrode, nanopores are formed by connecting a metal plate or a film to an anode, putting the anode-connected metal plate or film into an acid solution and applying a predetermined voltage to the metal plate or the film for anodization.

The porous template can be formed through a preparing process of the porous aluminum oxide. An aluminum substrate is put into an acid solution such as sulphuric acid, phosphoric acid, or oxalic acid, and a predetermined level of voltage is applied to the aluminum substrate, wherein the voltage is preferably in the range of 5 V to 400 V. Then, well-arranged nanopores having a diameter of 5 nm to 1000 nm are formed in a thickness of few micrometers. The nanopores preferably have a diameter of 5 nm to 500 nm. The thickness of nanoporenanopores can be controlled according to experiment time and conditions.

Figure 3:
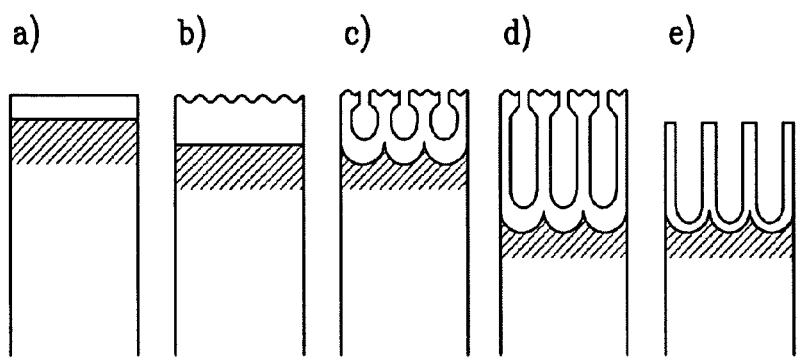
FIG. 3 shows views illustrating changes of the porous anodized aluminum oxide prepared in accordance with a preferred embodiment of the present invention.

In FIGS. 3, (a) to (e) present diagrams illustrating a process of forming the porous aluminum oxide layer prepared by the above-mentioned methods. In FIGS. 3, (a) to(d) show the changes in the shape of the oxide layer according to time.

In the initial stage, a thin oxide layer is formed uniformly on an aluminum substrate (see FIG. 3(a)). Then, as the volume of the oxide layer is expanded, the surface of the oxide layer becomes non-uniform (see FIG. 3(b)). If the surface of the oxide layer is non-uniform, its current density also becomes non-uniform. That is, the current density is increased at a concave portion on the uniform oxide layer and it is decreased at a convex portion on the non-uniform oxide layer.

Subsequently, nanopores are formed in the concave portion of the oxide layer where the current density is high due to the effect of an electric field and the electrolyte effect of an acid solution. When a predetermined time has passed, the increase in the size of the nanopores stops (see FIG. 3(c)). The number of nanopores is maintained constantly and the thickness of the nanopores is increased rapidly (see FIG. 3(d)).

The size of the nanopores can be controlled by the kind of acid solution used and/or the magnitude of the applied voltage. In the preferred embodiment of the present invention, a preferable diameter of the nanopores is in the range of 5 nm to 500 nm. In the case that the nanopores have a diameter smaller than 5 nm, it is difficult to form the rod-type or tube-type second electrode inside of the nanopores. If the diameter of the nanopores exceeds 500 nm, it is hard to form an electrode system having a wide surface area.

After the nanopores are formed in a desired diameter and depth on the aluminum substrate, a nanopore layer formed on the upper surface of the porous aluminum oxide layer and an oxide film formed on a bottom surface of the porous aluminum oxide are eliminated by using a chemical etching method with a acid solution or a mixed solution of phosphate or chromic acid in order to expose an aluminum electrode over the surface, which is shown in FIG. 3E.

Figure 4:
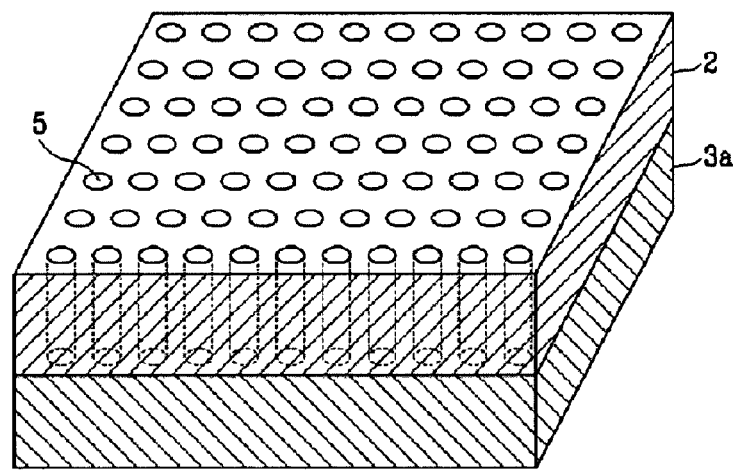
FIG. 4 is a perspective view illustrating a porous anodized aluminum oxide in accordance with a preferred embodiment of the present invention.

FIG. 4 is a perspective view illustrating a porous aluminum oxide layer prepared in accordance with the above-described method. That is, it shows the porous aluminum oxide prepared according to the above-mentioned methods. As shown in FIG. 4, reference numeral '2' indicates a porous template layer having a plurality of nanopores, reference numeral '3a' indicates an aluminum electrode having the porous template layer 2, and reference numeral '5' indicates nanopores formed on the porous template layer. If the aluminum is to be used as the substrate and the first electrode as mentioned above, there is a restriction in that the aluminum electrode should not influence the operation of an electric device having the porous aluminum oxide. However, there is an advantage in that the preparation process can be simple.

Method 2-2

If the first electrode is not aluminum, the first electrode is formed on a substrate and an aluminum layer is deposited on the first electrode.

Herein, the first electrode is formed according to a conventional electrode forming method and the aluminum layer is deposited by using a vacuum evaporation method such as a sputtering, thermal deposition, e-beam evaporation, or electroplating method.

Figure 5:
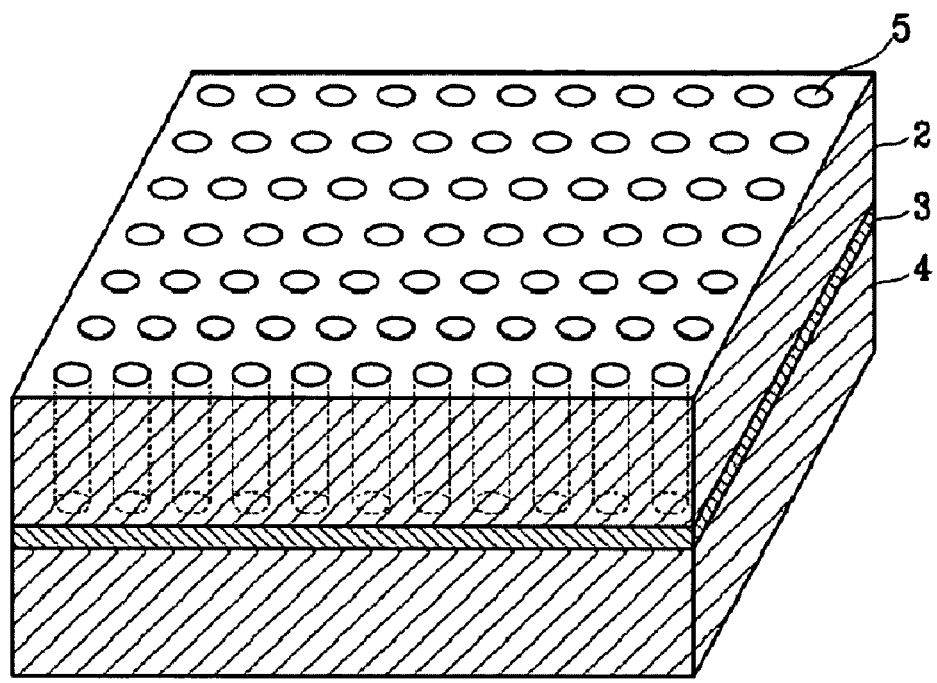
FIG. 5 is a perspective view illustrating a porous template in accordance with a preferred embodiment of the present invention.

In case of the electroplating method, the surface must be polished. If the deposited aluminum layer is anodized according to the method 2-1, the porous template of the aluminum layer is formed on a desired substrate. However, an acid solution used for eliminating an oxide layer of the aluminum layer must be carefully selected, considering the substrate and the electrode. FIG. 5 is a perspective view showing the porous template formed according to the above-mentioned process. As shown in FIG. 5, reference numeral '2' indicates the porous template layer having a plurality of nanopores, reference numeral '3' indicates the first electrode layer, reference numeral '4' indicates the substrate and reference numeral '5' indicates the nanopores. The above-mentioned method has an advantage in that diverse types of electrodes and substrates can be used selectively according to their characteristics.

By filling the inside of the nanopores formed on the porous template layer with an electrode material, a rod-type or tube-type second electrode having a wide surface is formed. For forming the second electrode, various methods such as electroplating, electroless plating, sol-gel coating, electropolymerization and Chemical Vapor Deposition (CVD) are used.

When the second electrode is formed, the shape of the second electrode is formed according to each method mentioned above, which is the shape of a rod or the shape of a tube. When the second electrode is formed by filling the inside of the nanopores, the shape of the second electrode becomes the shape of a rod. When the second electrode is formed along the wall inside the nanopores, the shape of the second electrode becomes the shape of a tube.

That is, the second electrode formed by the electroplating, electropolymerization and CVD would become the rod-type second electrode, and the second electrode formed by the electroless plating, the sol-gel coating, and the electropolymerization would becomes the tube-type second electrode. In the case of a rod-type second electrode, an electrode system having a wide surface area can be obtained by eliminating the porous aluminum oxide layer after forming the second electrode. In the case of the tube-type second electrode, the tube-type second electrode can be used with or without the porous aluminum oxide layer.

Figure 6:
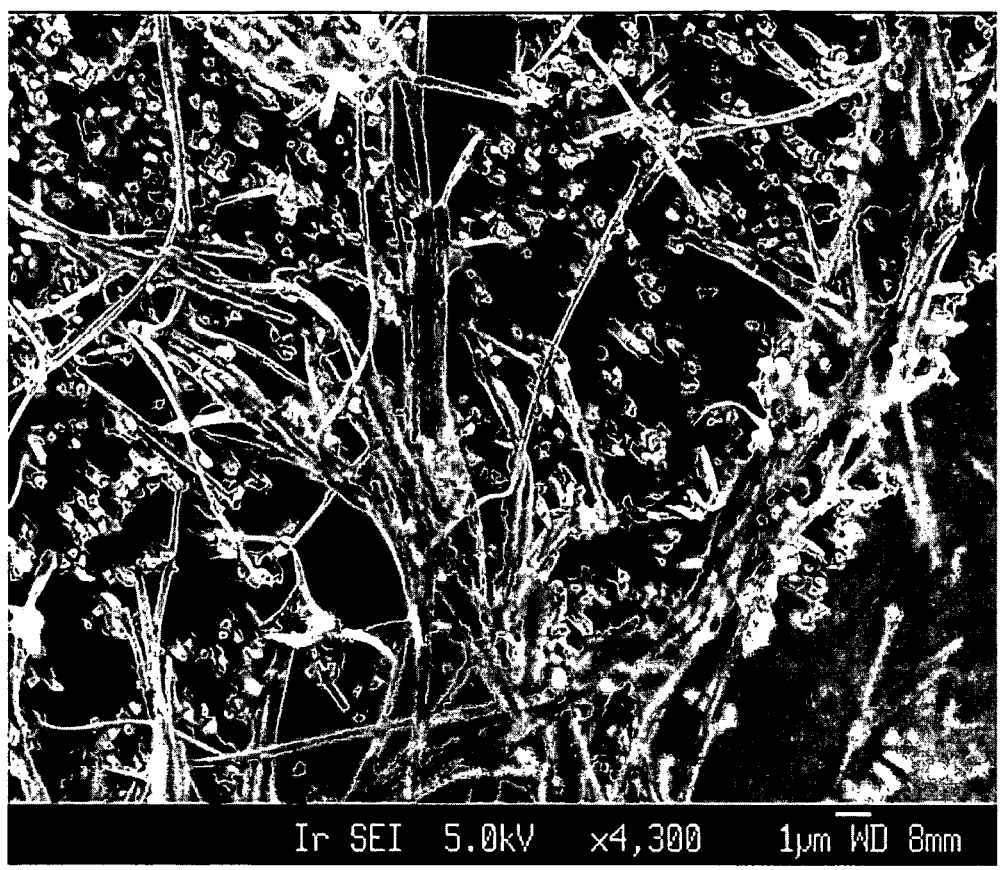
FIG. 6 is a Scanning Electron Microscope (SEM) view showing the second electrode, which is of silver, i.e., Ag, formed inside a pore by electro plating.
Figure 7:
FIG. 7 is a SEM view showing the porous template having the second electrode (Ag) formed inside nanopores by electro plating.
Figure 8:
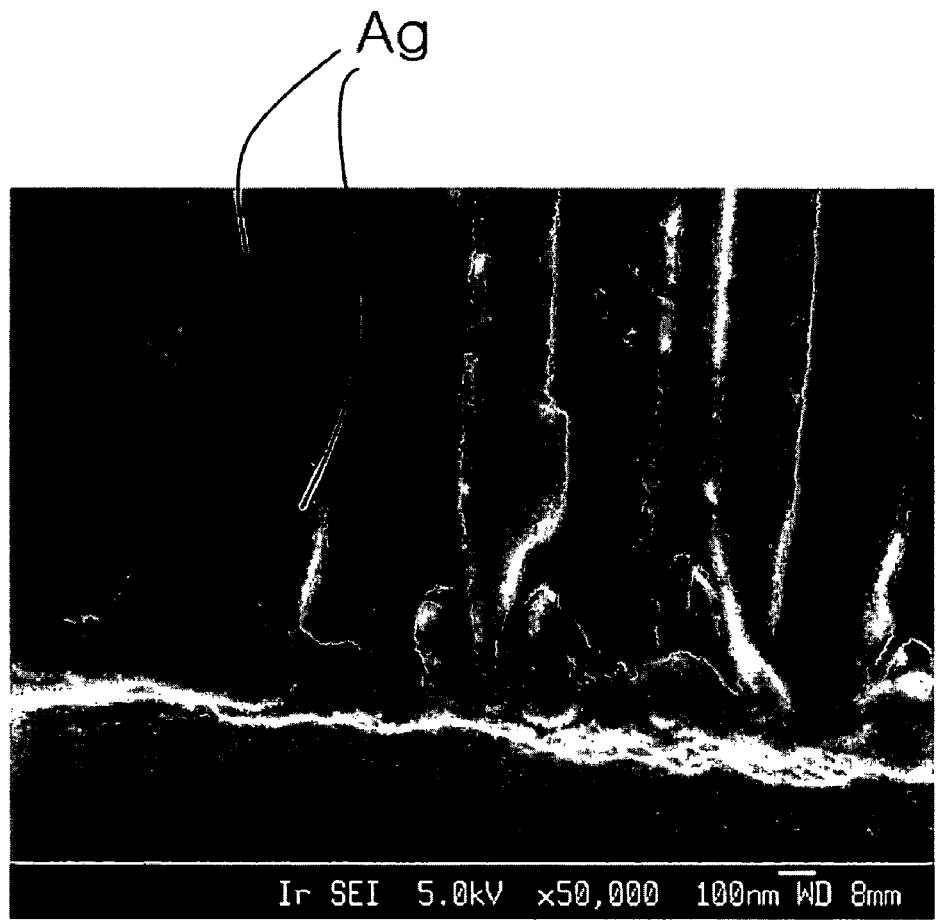
FIG. 8 is an enlarged SEM view showing a predetermined part of the FIG. 7.

The electroplating for forming the second electrode can use any types of electrode for plating. Preferably, it is formed by using at least one metal selected from the group consisting of Au, Pt, Ag, Cr, and Cu. When the second electrode is formed by using electroplating, general conditions for electroplating can be used. FIG. 6 is a scanning electron microscope (SEM) view showing the second electrode, which is of silver, i.e., Ag, formed in the inside of the nanopores by the electroplating and FIG. 7 is a SEM view showing the porous template having the second electrode (Ag) formed inside nanopores through electroplating. FIG. 8 is an enlarged SEM view showing a predetermined part of FIG. 7.

In the case that electroless plating is used for forming the second electrode, any types of plating materials can be used. Preferably, it uses at least one metal selected from the group consisting of Au, Pt, Ag, Cr, and Cu, and at least one metal oxide selected from the group consisting of $TiO_2$, Indium Tin Oxide (ITO), ZnO, $WO_3$, $RuO_2$, $IrO_2$, $SnO_2$, and NiO. The electroless plating used for forming the second electrode is general electroless plating.

In the case of using the sol-gel coating for forming the second electrode, it preferably uses at least one metal oxide selected from the group consisting of $TiO_2$, ITO (Indium Tin Oxide), ZnO, $WO_3$, $RuO_2$, $IrO_2$, $SnO_2$, and NiO. The porous template having the first electrode is put into a solution with a precursor of the metal oxide. The porous template having the first electrode is taken out of the solution and heat treatment is performed on the porous template. By the heat treatment, a solvent is evaporated, and then the second electrode is formed inside the nanopores in the porous template.

Figure 9:
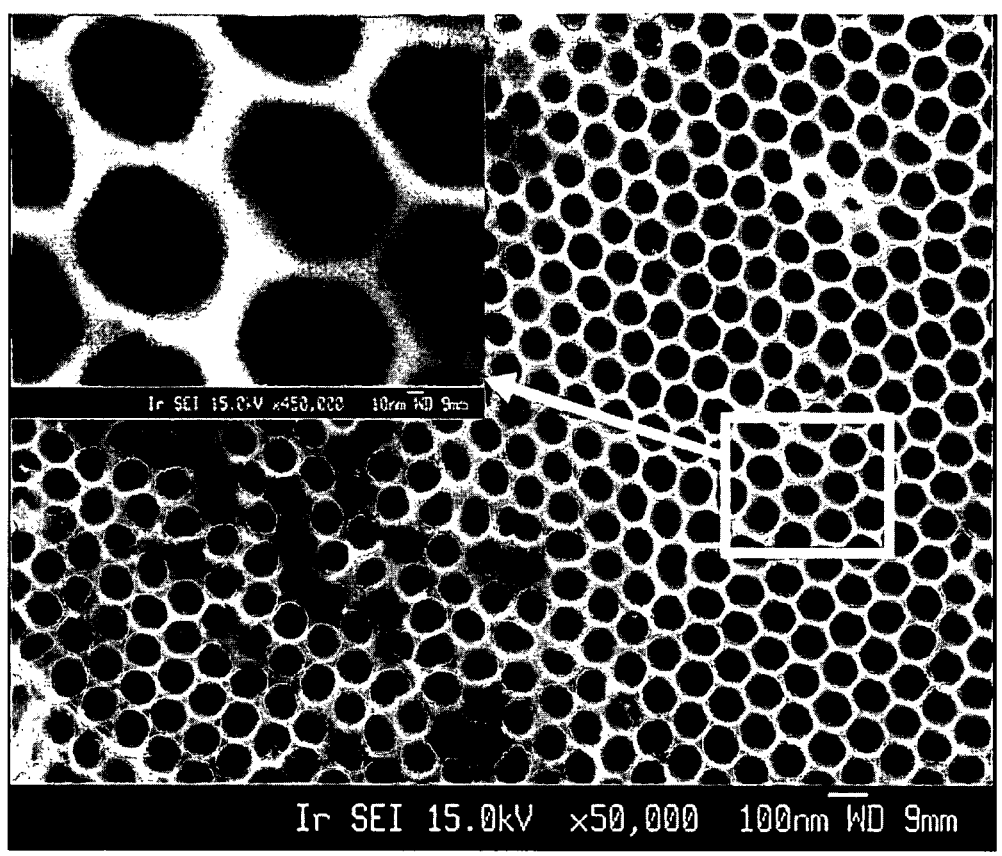
FIG. 9 is a SEM view illustrating a PEDOT (poly-3,4-ethylenedoxythiophene) conductive polymer tube formed in the nanopores of the porous template by electropolymerization.
Figure 10:
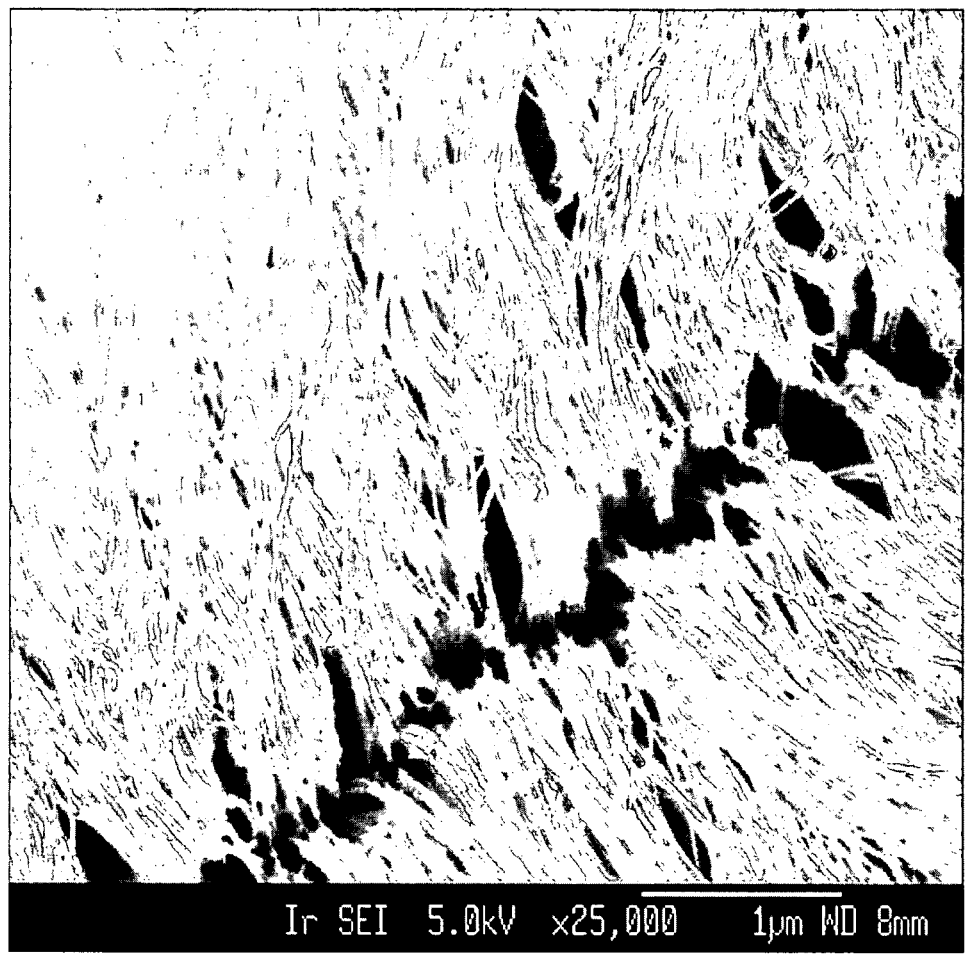
FIG. 10 is a SEM view showing a PEDOT conductive polymer tube after eliminating the nanopores of the porous template.

In the case that electropolymerization is used to form the second electrode, it can use the precursor of a conductive polymer. Preferably, it uses at least one precursor of a conductive polymer selected from the group consisting of poly-p-phenylene, polyphenylenevinylene, poly-3,4-ethylenedoxythiophene (PEDOT), polypyrrole, polyaniline, polyazulene, polythiophene, polypyridine, polyindole, polycabazole, polyazine, and polyquinone. When the electropolymerization is performed by putting a first electrode having a porous template into a solution in which the precursor of the conductive polymer is dissolved, a rod-type or a tube-type electrode is formed in the inside of nanopores in the porous template. FIG. 9 is a SEM view illustrating a PEDOT conductive polymer tube formed in the nanopores of the porous template by the electropolymerization, and FIG. 10 is a SEM view showing a PEDOT conductive polymer tube after eliminating the nanopores from the porous template.

In the case of the tube-type second electrode, it can be used with or without the porous template. However, in the case of the rod-type second electrode, the porous template should be eliminated to exposes the surface of the electrode and use the wide surface of the electrode. The porous template can be dissolved by using a basic solution having pH higher than pH 8 which is the basic solution including KOH and NaOH.

Among the electrode systems for an electric device prepared according to the above mentioned methods, the porous template eliminated electrode system includes the first electrode, which is a flat electrode, and the second electrode, which can be either a rod-type or tube-type, electrically connected to the first electrode. In the meantime, the electrode system where no porous template is eliminated includes the first electrode, the second electrode and additionally the porous template having a plurality of nanopores with a diameter of 5 nm to 500 nm. Inside the nanopores in the porous template, the rod-type second electrode or the tube-type second electrode is formed.

A surface area of the electrode system prepared by the methods of the present invention is increased to $2\,Ld/r$ times as large as that of a conventional electrode system, wherein d is a pore density, r is a radius of the nanopores, and L is a length of the rod or the tube. For example, if the radius of the nanopores is 50 nm, the pore density is 50% and the length is 5 μm, and the surface area of the electrode system is increased by 100 times as large.

Accordingly, the electrode system of the present invention can be implemented into various electric devices such as an electrochromic device, a solar cell and a super-capacitor. The electric devices include the electrode system and an additional electrode which is used in typical electric devices. Preferably, aluminum, silicon or a transparent conductive glass (ITO/glass) can be used.

The electrochromic device using the electrode system having a high surface area includes one of the rod-type second electrode or the tube-type second electrode has a diffusion barrier thinner than that in a conventional electrochromic device. The diffusion rate of the electrochromic device is very fast and, therefore, the electrochromic device is superior in responding to an external electric signal. Also, it has a superior ability of coloration since the second electrodes are densely arranged. The diffusion barrier is defined as a thickness of an external wall of the bar-type and the tube-type second electrode.

The electrochromic device having the electrode system of the present invention can overcome an slow bleaching problem caused by the slow diffusion through thick diffusion layer. The conventional electrochromic device has the electric discoloring problem that is caused by the thick diffusion barrier. Also, it prevents from trapping ions within a film so that a color contrast is increased during coloration and bleaching.

In the solar cell including the high surface area electrode system, an electron-hole pair layer is formed on the second electrode based on self-assembly, a solution coating or an electropolymerization.

The generated electrons are transferred by using the second electrode. A ruthenium-series of a organometallic complex is used for the self-assembly for forming the electron-hole pair layer and a polymer material such as a polyaniline or PEDOT is used for the solution coating. Furthermore, in the electropolymerization, the polyaniline, the PEDOT and its derivatives and a mixture of derivatives can be used. A hole transferring layer is formed on the electron-hole pair layer by using vacuum evaporation, sol-gel coating, solution coating and electrolyte injection. For forming the hole transferring layer, a material of aryl amine-series can be used in the case of using vacuum evaporation, a polymer material such as PEDOT/PSS (Poly styrene sulfonic acid) can be used in the case of using the solution coating and an aqueous solution or polymer electrolyte material can be used in the case of using the electrolyte injection.

The solar cell having the high surface area electrode system can be prepared by forming an electrode material on the hole transferring layer. More electron-hole pairs can be generated on the high surface area and generated electron-hole pairs are transferred to electrode without much loss since the electron-hole pairs are generated the electrode layer or the electrode layer is very near the hole transferring layer. Therefore, efficiency of transferring electron-hole pair increases by 10 to 100 times compared with the conventional solar cell having a flat electrode system.

A supercapacitor is a capacitor having a considerably fast speed of charge transfer, a high power density, and a rapid charging and discharging speed and long life cycle by reversible faradaic oxidation/reduction at an electrode/electrolyte interface in comparison with a conventional lithium-series secondary battery.

The supercapacitor stores charges at the electrode/electrolyte interface. Therefore, the capacity of the storage charge is increased in proportion to the size of the surface area of the electrode system when the high electrode system of the present invention is applied to the supercapacitor. Also, the time for charging and discharging becomes faster because of the short diffusion distance and free entrance of the electrolyte, compared with a conventional supercapacitor.

The supercapacitor having the enlarged electrode/electrolyte interface is prepared by arranging two high surface area electrode systems facing each other, and bonding two high surface area electrode systems within a predetermined space therebetween while using a bonding material and injecting an electrolyte solution therein.

The electrode systems used for the supercapacitor can be either same type or different type. Voltage and capacity of the supercapacitor are determined according to the type of electrodes and active electrode material. In the case that tube-type or a rod-type metal oxide electrodes are used, such as $TiO_2$, $ZnO$, $SnO_2$, and $NiO$, characteristics of the super-capacitor such as electric potential, capacity, response speed, and charging/discharging cycle can be controlled by spreading an electro-active material on the surface of the metal oxide electrode.

The electro-active material capable of oxidation-reduction is one of a conductive polymer, an small redox-active organic material and an redox-active organo-metallic complex. The conductive polymer is at least one selected from the group consisting of poly-p-phenylene, polyphenylenevinylene, poly-3,4-ethylenedoxythiophene (PEDOT), polypyrrole, polyaniline, polyazulene, polythiophene, polypyridine, polyindole, polycabazole, polyazine, and polyquinone. The conductive polymer is spread by using one of spin-coating, deep-coating and electropolymerization.

The small redox-active organic material is at least one selected from the group consisting of a bipyridium functional group; a quinone functional group including a benzoquinone, a naphthoquinone, and an anthraquinone; and an azine functional group including a phenoxiazine, a phenoxazine, and a phenazine.

The redix-active organometallic complex is at least one selected from the group consisting of a metallocene complex including ferrocene, ruthenocene, and cobaltocene, and a non-metallocene metal complex including tris (8-hydroxyquinoline)-aluminum (AlQ3), and tris(salicylic acid)-iron-trichloride.

The supercapacitor having the above-mentioned structure has a large capacity for storage charges, fast charge response speed, and rapid charging/discharging speed, since it has the large surface area of electrodes. That is, the above-mentioned supercapacitor has a capacity increased of 10 to 100 times and has a speed of 10 to 100 times faster than that of a conventional supercapacitor having a flat electrode.

Hereinafter, the present invention is described in more detail through examples. However, the following examples are only for the understanding of the present invention, and they do not limit the present invention.

EXPERIMENTAL EXAMPLE 1

Preparation of Electochromic 1-1 Preparation of Porous Template

For preparing a porous template on a first electrode, an aluminum layer was vacuum-evaporated on an ITO deposited glass substrate based on a sputtering or e-beam depositing method with an evaporation speed slower than 10 Å/sec for forming a smooth surface of the aluminum layer, wherein a thickness of the aluminum was less than 1 μm and a thickness of the ITO was less than 150 nm. A surface of the substrate having the vacuum evaporated aluminum layer was put into an acetone solution and a sonication process was performed for 5 minutes for cleaning the surface of the substrate. The cleaned substrate was put into a 0.3M oxalic acid anodization bath, and was connected to an anode of an electric source. A platinum (Pt) plate as a reference electrode was put into the anodization bath, and was connected to the cathode of the electric source. 40 V was applied to the cathode and the anode and the anodization process was performed for few minutes. After the anodization process, the substrate was rinsed with deionized (DI) water. The oxide aluminum anode layer formed inside the nanopores was eliminated by putting the rinsed substrate into 5 wt % of a phosphoric acid for 30 seconds, and thus, the aluminum oxide layer was formed on the ITO transparent electrode surface as the porous template.

1-2 Preparation of a Rod-Type/Tube-Type Second Electrode

The prepared porous template was put into a reaction bath with a polymerization solution and was connected to the anode. Also, an Ag/AgCl electrode and a Pt electrode were put into the reaction bath as a counter electrode, and connected to a potentiostat/galvanostat; (EG&G Princeton Applied Research model M273). The polymerization solution was a 0.1 M $LiClO_4$/acetonitrile solution with 10 mM 2.3-dihydrothieno[3.4-b]-1,4-dioxin. The electropolymerization was performed by using the potentiostat/galvanostat with 60 mA as a constant current condition for 10 minutes. Therefore, poly-3,4-etilendioxityopen (PEDOT) was generated inside the nanopores in the porous template and the color of the porous template layer was changed from white to dark purple. FIG. 9 is a SEM view of the electrode system prepared by the above-mentioned method. As shown in FIG. 9, a surface area of the electrode system had a pore density of 70% for one side of the porous template, with nanopores with a diameter of 50 nm, and resulted in a tube or a bar having a length of 1 μm. Therefore, the surface area of the electrode system was 30 times enlarged, calculated from the equation of $2Ld/r$, compared to a surface area of a flat electrode.

1-3 Preparation of Electrochromic Device

The electrochromic device was prepared by arranging the electrode on an ITO deposited glass substrate, arranging another ITO deposited glass substrate on the opposite side of the electrode to be an asymmetrical structure, and sealing the arranged ITO deposited glass substrates remaining one side unsealed by using an epoxy resin. A 0.1 M $LiClO_4$/acetonitrile electrolyte solution was injected through the unsealed side, and the unsealed side for injecting was then sealed by using a sealant.

EXPERIMENTAL EXAMPLE 2

Preparation of Solar Cell 2-1 Preparation of Porous Template

A porous template for the solar cell was prepared by an identical method of Experimental Example 1 excepting that an aluminum layer deposited substrate was used. In Experimental Example 2, aluminum foil having a thickness of 0.25 mm was used by cutting the aluminum foil to have a size of 1 cm×2 cm. The porous template of Experimental Example 2 included an aluminum electrode below the porous template as shown in FIG. 4, and included an aluminum oxide anode layer ($Al_2O_3$) which is a porous template.

2-2 Preparation of Tube Type Second Electrode

A $TiO_2$ tube-type second electrode was prepared inside of the nanopores in the porous template by using a sol-gel coating method, as follows. The porous template was put into a titanium isoperoxide, put into distilled water, and dried. After drying the porous template, annealing was performed at a temperature of 100° C. for one hour, and annealing was performed again at a temperature of 400° C. for six hours.

2-3 Preparation of Solar Cell

On the electrode system prepared according to 2-2, an electron-hole pair generation layer was coated by a solution coating method with a polyaniline. That is, the electrode system was put into a 1 wt % polyaniline emeraldine base/NMP solution for 30 minutes. As a result of the solution coating, the polyaniline was formed as a tube according to a shape of the $TiO_2$ tube-type second electrode. After solution coating, a PEDOT/PSS (Baytron P) was coated on the electrode system by using spin-coating, and the ITO was formed as an upper electrode.

Figure 11:
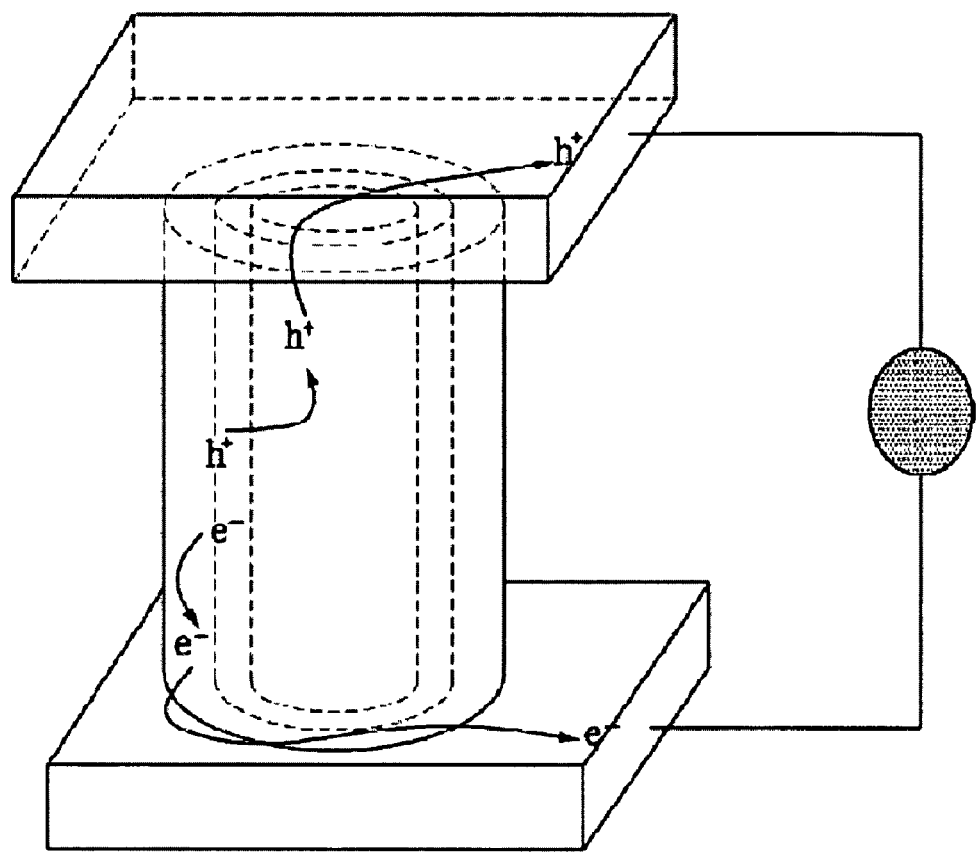
FIG. 11 is a diagram showing transfer of electrons and holes in a solar battery having an electrode system in accordance with a preferred embodiment of the present invention.

FIG. 11 is a diagram showing transfer of electrons and holes in a solar battery having an electrode system in accordance with the preferred embodiment of the present invention. As shown, the electrons and the holes are easily transferred around the electrode system. That is, it is shown that efficiency of the solar cell is increased.

EXPERIMENTAL EXAMPLE 3

Preparation of Supercapacitor 3-1 Preparation of Electrode A

For preparing one electrode used for a supercapacitor, a tube-type $TiO_2$ second electrode was formed on a flat aluminum substrate according to the method used for the experimental example 2. The tube-type $TiO_2$ second electrode was put into 50 ml of an aqueous solution with 0.010M of [β-(10-phenothiazyl)propoxy]-phosphonic acid and 0.10M of $Li[(CF_3SO_2)_2N]$ for 60 minutes. Subsequently, the tube-type $TiO_2$ second electrode was taken out of the aqueous solution, washed three times with 95% ethanol, and dried to prepare the redox-active material coated on tube-type $TiO_2$ second electrode.

3-2 Preparation of Electrode B

For preparing another electrode used for a supercapacitor, an electrode system was prepared according to the method used in Experimental Example 1. The electrode system includes the porous aluminum oxide and the second electrode prepared by electropolymerizing the PEDOT polymer at the porous aluminum oxide.

3-3 Preparation of Supercapacitor

The supercapacitor was prepared by facing the electrode A and the electrode B, sealing except a predetermined part, injecting 0.1 M $Li[(CF_3SO_2)_2N]$/acetonitrile electrolyte through the predetermined part, and sealing the predetermined part.

COMPARATIVE EXAMPLE 1

General Electrochromic Device

An ITO deposited glass substrate was put into a reaction bath with a polymerization solution and was connected to an anode. Also, an Ag/AgCl electrode as a reference electrode and a Pt electrode as a counter electrode were put into the reaction bath and connected to a potentiostat. The polymerization solution was a 0.1 M $LiClO_4$/acetonitrile solution containing 10 mM of 2.3-dihydrothieno[3.4-b]-1 and 4-dioxin. The electro polymerization was performed by using the potentiostat with a constant current of 60 mA for 10 minutes. As a result of the electro polymerization, PEDOT was formed on the ITO deposited glass substrate. It is observed that the color of the transparent substrate was changed to deep purple color. On the prepared substrate, another ITO deposited glass substrate was arranged and they were sealed using epoxy resin. During sealing, one side was left unsealed so that the electrolyte solution of 0.1 M LiClO4/acetonitrile can be injected. After injection, the unsealed side was sealed.

TEST EXAMPLE 1

Analyzing Response Speed of Electrochromic Device

Figure 12:
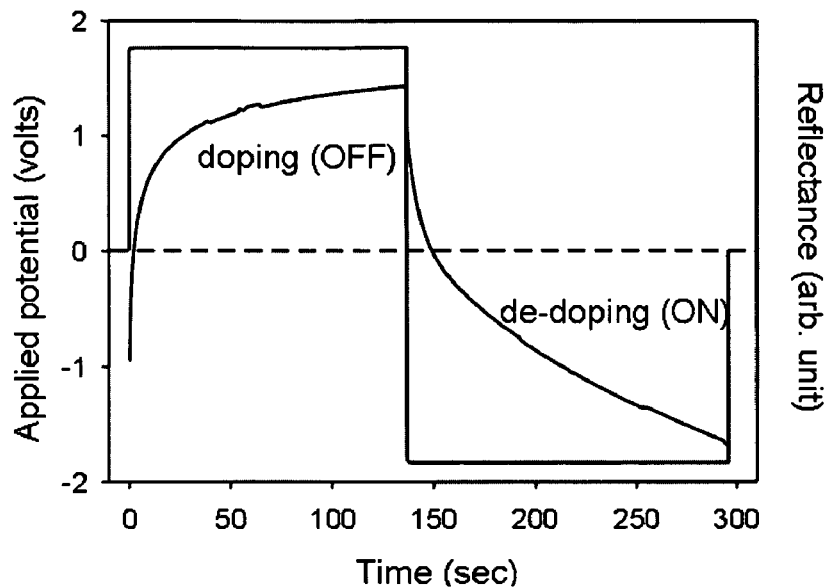
FIG. 12 is a graph showing a response speed of an electrochromic device of a Comparative Example 1.
Figure 13:
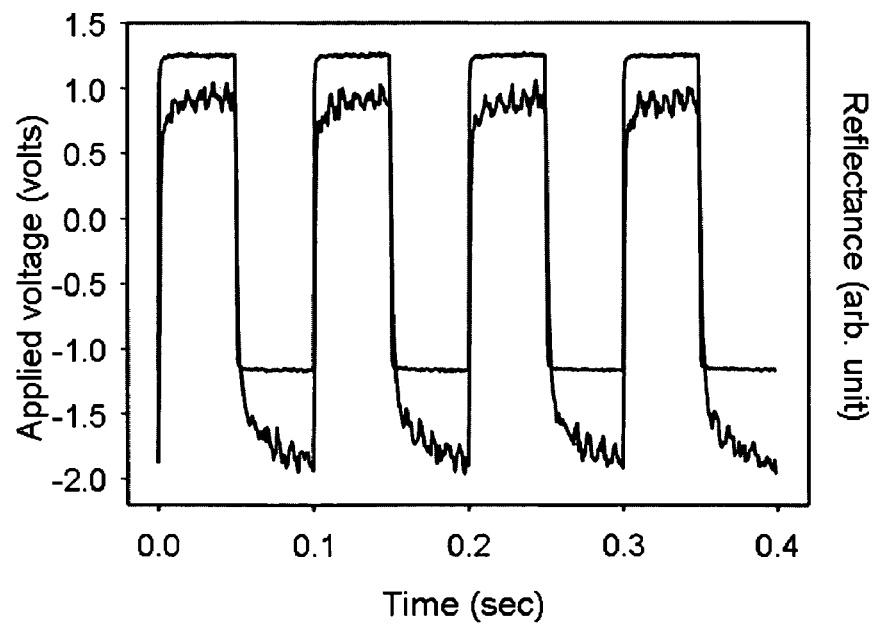
FIG. 13 is a graph showing a response speed of an electrochromic device of an Experimental Example 1.

Response speeds of the electrochromic device of Experimental Example 1 and the electrochromic device of Comparative Example 1 were analyzed by measuring intensity of reflected light according to time when the light was on/off, using a He—Ne laser as a light source and a photo-diode detector at an ordinary temperature in a laboratorial environment. The results are shown in FIGS. 12 and 13. As shown in FIG. 12, the electrochromic device of Comparative Example 1 changes its color similar to a device using a porous aluminum oxide, but its response speed was approximately 300 seconds. On the contrary, the electrochromic device having the high surface area electrode system of Experimental Example 1 had a response speed of 0.1 second as shown in FIG. 13, which is 3000 times faster than that of Comparative Example 1.

The electrode system of the present invention can improve efficiency and performance of various electric devices since the surface area of the electrode system is large. Especially, the contrast and respond speed of the electrochromic device can be increased, the number of electron-hole pairs of the solar battery can be increased, and loss of the electron-hole pairs can be minimized. Also, the charge storage capacity of the supercapacitor and the charge respond speed can be increased.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An electrode system for an electric device, comprising:
   (i) a first electrode which is a flat electrode;
   (ii) a second electrode which is a tube-type electrode, wherein the second electrode is formed by using: a) at least one metal selected from the group consisting of Au, Pt, Ag, Cu, Al, Cr, and alloys thereof; or b) at least one metal oxide selected from the group consisting of $TiTO_2$, Indium Tin Oxide, ZnO, $WO_3$, $RuO_2$, $IrO_2$, $SnO_2$, and NiO; and (iii) a porous template having nanopores with a diameter of 5 nm to 500 nm, where the porous template is arranged on the first electrode, the porous template includes the second electrode inside of the nanopores for electrically being connected to the first electrode, and the porous template is formed of an anodized aluminum oxide, wherein the electric device is an electrochromic device, a solar cell, or a supercapacitor.

2. The electrode system for the electric device of claim 1, wherein the first electrode is formed by using:
   a) at least one selected from the group consisting of Au, Pt, Ag, Cu, Al, Cr, and alloys thereof;
   b) at least one metal oxide selected from the group consisting of $TiO_2$, Indium Tin Oxide (ITO), ZnO, $WO_3$, $RuO_2$, $IrO_2$, $SnO_2$, and NiO; or
   c) at least one conductive polymer selected from the group consisting of poly-p-phenylene, polyphenylenevinylene, poly-3,4-ethylenedoxythiophene (PEDOT), polypyrrole, polyaniline, polyazulene, polythiophene, polypyridine, polyindole, polycabazole, polyazine, and polyquinone.

3. An electric device, comprising:
an electrode system for the electric device including
(i) a first electrode which is a flat electrode;
(ii) a second electrode which is a tube-type electrode, wherein the second electrode is formed by using: a) at least one metal selected from the group consisting of Au, Pt, Ag, Cu, Al, Cr, and alloys thereof; or b) at least one metal oxide selected from the group consisting of $TiTO_2$, Indium Tin Oxide, ZnO, $WO_3$, $RuO_2$, $IrO_2$, $SnO_2$, and NiO;
(iii) a porous template having nanopores with a diameter of 5 nm to 500 nm, wherein the porous template is arranged on the first electrode, the porous template includes the second electrode inside of the nanopores for electrically being connected to the first electrode, and the porous template is formed of an anodized aluminum oxide; and
(iv) a substrate, wherein the electric device is an electrochromic device, a solar cell, or supercapacitor.

4. The electrode system for the electric device of claim 3, wherein the substrate is aluminum, silicon, or a transparent conductive glass (ITO/glass).

* * * * *